United States Patent Office 3,616,604
Patented Nov. 2, 1971

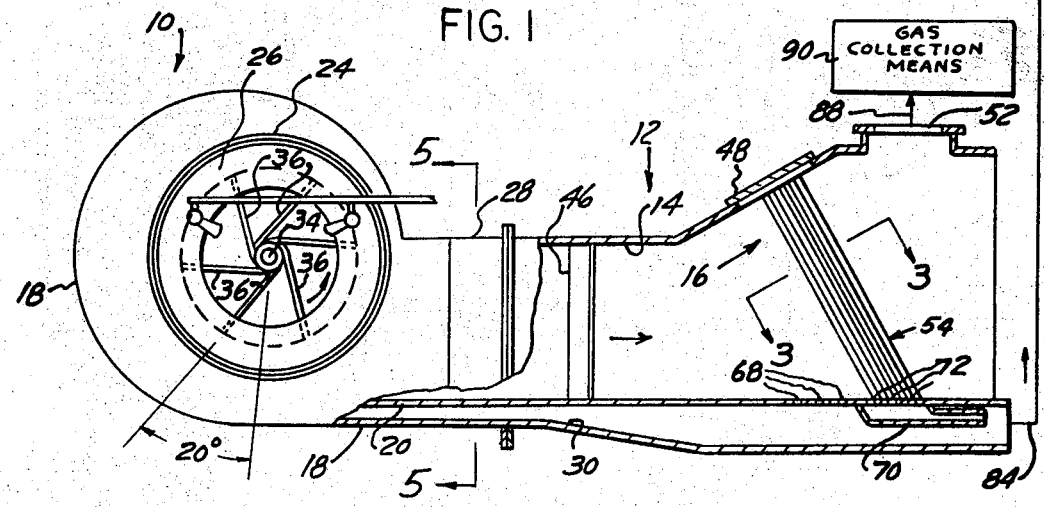
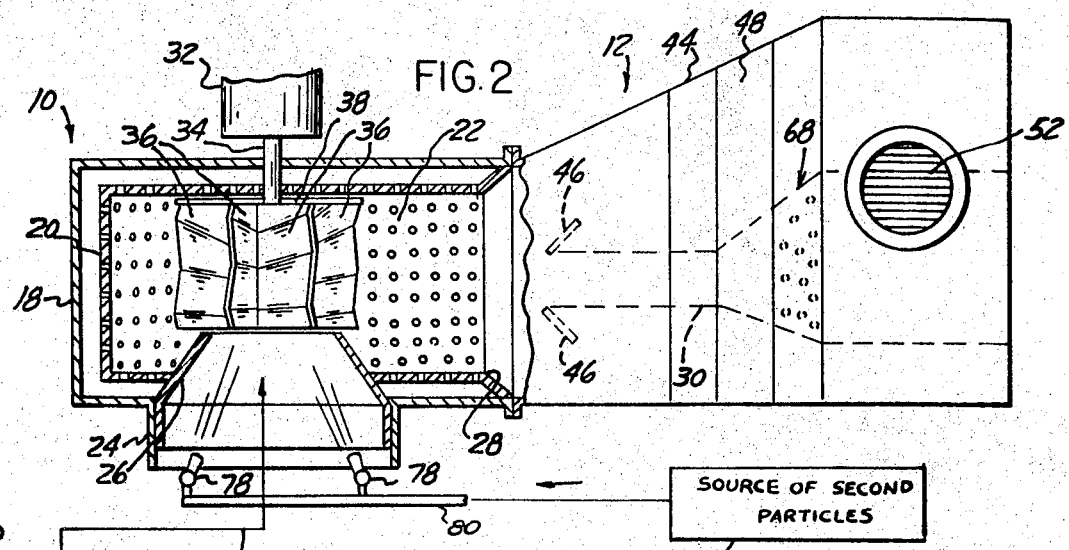
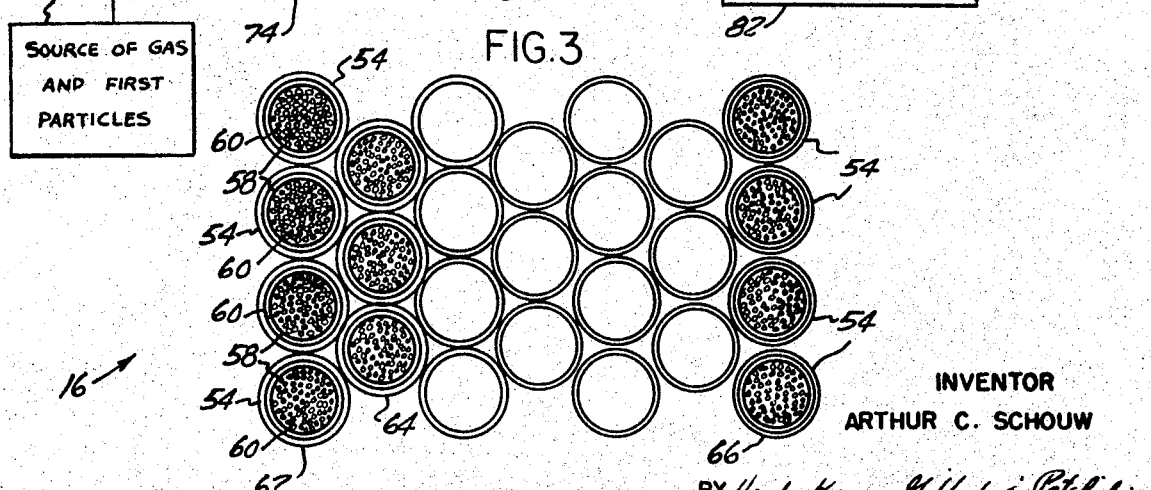

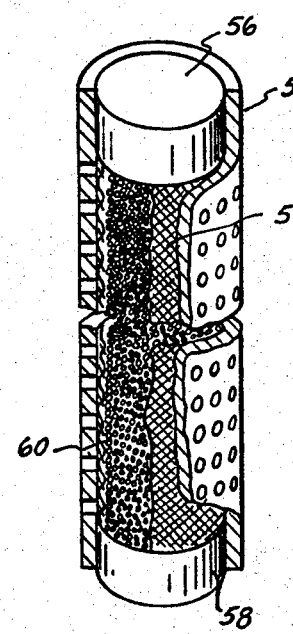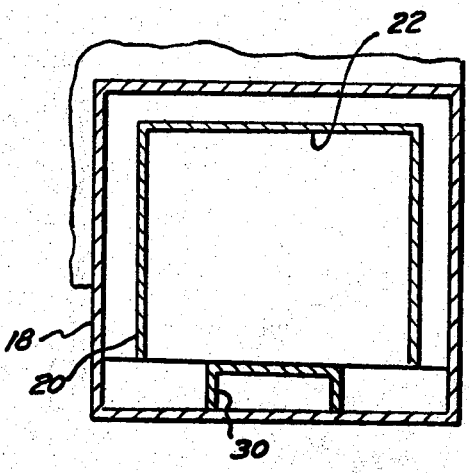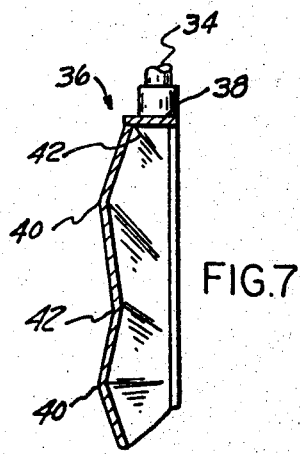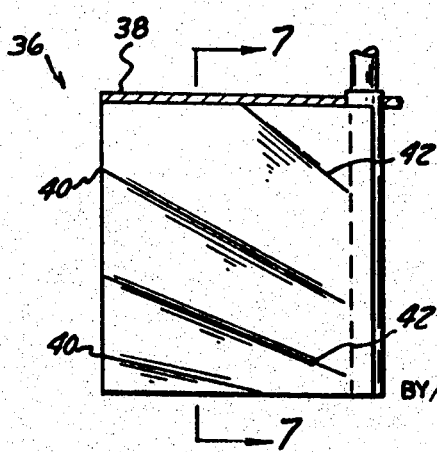

3,616,604
LIQUID RECOVERY APPARATUS
Arthur C. Schouw, Corunna, Mich., assignor to Tri-Mer Corporation, Owosso, Mich.
Continuation-in-part of application Ser. No. 548,729, May 9, 1966. This application Jan. 2, 1968, Ser. No. 695,198
Int. Cl. B03c 3/30
U.S. Cl. 55—103
8 Claims

ABSTRACT OF THE DISCLOSURE

Apparatus for recovering compounds from industrial gases by introducing a liquid substance thereto and delivering them to a mixing chamber having a fan for mixing the two substances together. The fan delivers the gas and liquid mixture to a tubular filter pack that separates the liquid from the gas.

CROSS REFERENCE TO RELATED APPLICATION

This application is a continuation-in-part of application Ser. No. 548,729, filed May 9, 1966, now abandoned.

BACKGROUND OF THE INVENTION (1) Field of the invention

This invention relates to an apparatus for treating an industrial gas by mixing liquid into the gas and then separating the liquid particles from the gas.

(2) Description of the prior art

A contributing factor in the problem of atmospheric air pollution results from gaseous discharge of the waste products from various industrial processes into the atmosphere. Considerable sums of money are spent for apparatus to purify the gases prior to their discharge into the atmosphere by removing some of the components of the gas. It has been suggested that the products removed from the gas be combined with other substances to form useful compounds. This is because a considerable quantity of the substances, such as sulfur dioxide, that are discharged as a waste product of some industrial processes are consumed in another form in other processes.

It is the broad purpose of the present invention to provide a solution to the problem of air pollution by industrial gases by combining the waste substances suspended in the gas with a liquid substance to form a compound that can be used in other processes or depending on the nature of the substances, discharged into the atmosphere or water without the risk of injurying plant or animal life.

SUMMARY

In my copending patent application, a novel filter apparatus was disclosed for removing industrial impurities from a gas. This apparatus in its simplest terms comprises a spiral casing for a centrifugal fan connected to a duct for receiving the discharge of the fan and a tubular filter pack in the duct arranged to remove particles from the gas as it flows toward the duct outlet. A liquid introduced into the gas prior to its delivery into the fan is mixed in the fan chamber to assist the filter pack in removing the liquid and the water soluble contaminates in the gas.

It was found that an unexpectedly high proportion of the contaminates in the gas were removed by the apparatus compared to the amount of energy and liquid supplied into the system. This proportion was much more than would normally be expected from a conventional scrubber system.

It is believed that the unusual efficiency in separating impurities from the gas is due to an attraction created in the system between the water vapor in the gas and the filter surfaces. The cause of this attraction is unknown, but it may be due to electrostatic charges built up by the fan. The attraction was so great that substantially all the contaminates in the gas could be removed with only about 3 to 4% of the water used in systems of comparable capacity. This makes feasible a novel process for removing industrial impurities from a gas by the combination of a complementary component of a useful by-product in a liquid form with the impurities prior to purifying the gas. Since large volumes of water are not necessary to purify the gas, small quantities of the liquid secondary component can be economically combined with the waste particles prior to the separation phase.

The apparatus is described in a system for removing sulfur dioxide from an industrial gas. This system has been chosen for purposes of illustration because substantial quantities of this substance are annually eliminated as a waste by-product from industrial processes while substantial quantities of the same substance are consumed annually in other processes such as in the process of combining sulfur dioxide with anhydrous ammonia to form ammonium sulfate which is useful as fertilizer.

The apparatus is useful for recovering one or more components from the waste gas. For purposes of illustration the apparatus is described as it could be used in the process which comprises the steps of introducing a substance such as a liquid anhydrous ammonia into a stream of the gas which is capable of combining with one or more components in the gas such as sulfur dioxide and water vapor. The gas with its suspended components and the liquid anhydrous ammonia are introduced into a mixing chamber where a fan mixes them together. The fan blades may electrostatically excite the gas and the particles of the suspended, mixed components as the particles travel over the surface of the blades. If so, this excitation is independent of external sources of power with the blade material being chosen to suit the electrostatic properties of the particles. Thus a non-corrosive plastic material is preferable in a corrosive atmosphere, however, stainless steel or other material can be used under other conditions or for other components.

The mixture is delivered to a filter composed of a series of perforated tubes which are inclined in the path of the gas flow. The tubes are preferably formed of a plastic.

Some of the tubes may be filled with plastic beads which also filter the water vapor, and perhaps by the development of a repellent charge relative to the charge of the separated particles. In any case, the flow of the gas through the tubes causes the particles to move axially toward the downstream end of the tubes and a collection means.

The fan in the mixing chamber has a series of planar blades mounted on a rotatable shaft and inclined rearwardly relative to the rotation of the shaft. The blades have a dynamically balanced construction so that as the circumferential loading on the blades increases with an increase in shaft rotation, it is counterbalanced by a corresponding increase in the centrifugal forces acting on the mass of the blades. Thus the blades can be made of a lightweight construction and still retain their dynamic stability over a wide range of fan loads.

The fan blades are preferably formed of a polyvinyl chloride which, in addition to being non-corrosive, may have the property of electrostatically charging the gas in the mixing chamber as the gas flows over the surfaces of the fan blades. Each fan blade is formed into a series of peaks and troughs extending from the base of the blades toward their free edge which help the blades to thoroughly agitate the particles in the mixing chamber.

Another example of a process illustrating the use of the apparatus of the invention is the separation of sulfur dioxide from a waste gas in the form of a moist mist leaving a relatively purified gaseous discharge.

Still other advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is an elevational view of an apparatus illustrating the preferred embodiment of the invention with parts of the particle and gas flow system shown schematically;

FIG. 2 is a plan view of the apparatus of FIG. 1;

FIG. 3 is an enlarged view of the preferred filter pack as seen along lines 3—3 of FIG. 1;

FIG. 4 is a perspective view of a preferred filter tube with parts broken away for purposes of description;

FIG. 5 is a sectional view as seen along lines 5—5 of FIG. 1;

FIG. 6 is an enlarged view of a preferred fan blade; and

FIG. 7 is a sectional view of the fan blade as seen along lines 7—7 of FIG. 6.

DESCRIPTION OF THE PREFERRED EMBODIMENT

Now, referring to the drawings, the preferred apparatus illustrating an example of the invention is shown in FIGS. 1 and 2 as comprising a fan assembly, indicated at 10, connected to a sheet metal, gas conducting structure generally indicated at 12 defining an internal passage 14 for receiving and directing a gas from the fan assembly 10 through a preferred filter means 16 for treatment.

The fan assembly 10 comprises a spiral outer casing 18 and a perforated inner casing 20 forming a mixing chamber 22. A cylindrical flange 24 and a conical inlet 26 mounted on the casings 18 and 20 provide means for receiving a gas into the interior of the mixing chamber 22. The casings 18 and 20 are joined together to form a tangential outlet 28 for the discharge of gas from the mixing chamber 22. The outlet 28 is connected with the passage 14 of the gas conducting structure 12. A bleeder passage 30 in the gas conducting structure 12 provides means for directing a portion of the gas from between the inner and outer casings 18 and 20 externally of the gas conducting passage 14.

A motor schematically shown at 32 is drivingly coupled to a shaft 34 which extends into the mixing chamber 22 and rotates in the counterclockwise direction as viewed through the conical inlet 26. A series of substantially planar blades 36 are mounted on the shaft 34, each being inclined in a reverse direction with respect to the normal direction of rotation of the shaft 34. Preferably the blades are mounted with an angle of inclination of 20° relative to a plane containing the axis of rotation of the shaft and the base of the blades. The rearward edges of the blades 36 are fixedly attached to a disk reinforcing member 38.

Referring to FIGS. 6 and 7, each blade 36 is bent into a series of peaks 40 and connecting troughs 42. The peaks 40 and troughs 42 diverge from the base toward the free edge of each blade and are inclined with respect to the axis of rotation of the shaft 34 in a direction away from the inlet 26. The configuration of the blades produces a churning effect of the gas as they rotate. In addition the blades tend to flex so that they thoroughly mix the particles in the chamber.

It can be seen that the backwardly inclined blade mounting arrangement is such that the circumferential loading applied on the blades as the shaft 34 rotates is counterbalanced by the tangential components of the centrifugal forces acting on the mass of each blade. This dynamic balance is reflected in a lighter blade construction.

The blades 36 are preferably formed of a polyvinyl chloride, polyvinyl dichloride or other similar materials having the property of being non-corrosive in a corrosive atmosphere and becoming electrostatically charged when gas passes over their surfaces. Any electrostatic charge is developed independently of an exterior source of electrical power. The nature of the charge produced, if any, must be related to the particular gas that is being agitated, the particles in the gas, and the material from which the blade is fabricated.

The gas conducting structure 12 receives the gas discharge from the fan assembly 10 through the passage 14 and, as best seen in FIG. 2, has an intermediate section 44 between the fan assembly 10 and the filter means 16 with an enlarged cross section in the direction of gas flow. This enlarged cross section produces a drop in the velocity of the moving gas and a corresponding pressure increase so that the moisture in the gas tends to condense upon contacting the filter means 16.

A pair of baffles 46 mounted in the passage 14 upstream of the filter means 16 function to agitate the gas as it travels from the mixing chamber 22 toward the filter means 16. The gas conducting structure 12 has a cover 48 providing access to the interior of the passage 14 to remove the filter means 16 for replacement or maintenance. The structure 12 has an upwardly directed outlet 52 downstream of the filter means 16 for the discharge of the purified gas.

Now referring to FIGS. 3 and 4, the filter means 16 comprises seven staggered rows of perforated, contiguous, tubes 54 which form a gas pervious barrier in the path of the gas delivered through the passage 14. The tubes 54 are inclined relative to the direction of gas flow and are formed from a polypropylene material which may be capable of becoming electrostatically charged when a gas is passed over its surface. A polyethylene plug 56 is mounted in the upper end of each tube and a similar polyethylene plug 58 is disposed in the lower end of each tube. A polyethylene cloth sock 59 may be disposed in each tube and when used, the sock contains a bed of beads 60 which have a diameter smaller than the perforations of the tube 54. If larger beads are utilized, or if no beads are utilized, then no sock is employed. The beads 60 are preferably formed of a polyvinylchloride or other material which apparently is also characterized by the property that it acquires an electrostatic charge when the gas is passed over its surface. The nature of the charge will of course depend on the material of the beads, the gas, and other factors. Thus it is to be understood that materials of tube 54 and its contents are selected according to the particles that are to be removed from the gas. As can be seen in FIG. 3, the first and second rows 62 and 64 facing the gas discharge from the mixing chamber and the last row 66 can be filled with the beads while the intermediate rows are empty.

Now referring to FIGS. 1 and 2, the bleeder passage 30 passes below the downstream end of the filter means 16 and is connected to the passage 14 immediately upstream of the lower ends of the tubes by a series of apertures 68 so that the gas flowing through the passage 30 acts as a venturi to aspirate particles removed from the gas through the bottom of the passage 14. A nozzle 70 mounted below the lower ends of the tubes 54 and in the bleeder passage 70 is fluidly connected through a second series of openings 72 so that it functions as a second venturi means to aspirate or draw the particles collected by the filter tubes 54.

Still referring again to FIGS. 1 and 2, the system further comprises conduit means 74 for delivering a gas from a source 76 containing, for example, particles of sulfur dioxide or other waste particles and water vapor and introducing the gas in the form of a stream into the inlet 26 of the fan assembly 10. Nozzle means 78 mounted adjacent the inlet 26 introduces, for example, liquid anhydrous ammonia through delivery means 80 from a soruce 82 into the gas stream. The gas, sulfur dioxide particles, and liquid anhydrous ammonia are thoroughly mixed in the mixing chamber 22 by the fan means to form particles of a compound from the reactants, such as ammonium sulphate in case of the above-named reactants. The gas and the particles of the compound are discharged by the fan through the passage 14 where the gas passes through the filter means 16. The filter means 16 separates the water vapor and the contained particles of the compound including liquid particles from the gas and discharges them with the assistance of the venturi means to a discharge conduit 84 and a collection means 86. The purified gas is discharged through the outlet 52 through a conduit 88 to a gas collection means 90.

The separation may occur because of a series of electrostatic effects. If so, the first takes place in the mixing chamber as the gas flows over the surface of the blades 36. The blades theoretically electrostatically charge the gas and then transfer the charged gas and the particles of the compound into the passage 14. Theoretically, the particles of the compound suspended in the gas also have an electrostatic charge. As the gas flows through the filter means 16, the surface of the tubes 54 theoretically become electrostatically excited and acquire an electrostatic charge that is attractive relative to the charge of the suspended particles of the compound carried in the gas. Thus the particles of the compound are attracted to the surface of the tubes. It is to be noted that any electrostatic energy is produced by the motion of the gas particles over the surfaces of the tubes independently of an exterior source of electrical power.

The particles of the compound collected on the surface of the tubes 54 are then directed into the interior of the tubes and under the influence of the moving gas move axially toward the lower downstream ends of the tubes. If attraction occurs because of electrostatic charges, the tubes tend to become charged by the mere flow of the gas over their surface; however, the difference in the electrostatic states between the tubes and the suspended particles is increased by charging the gas in the mixing chamber thereby increasing the efficiency of the separation process.

If electrostatic charges are involved, the beads 60 in the tubes presumably also become excited by the passage of the gas through the tubes and acquire a charge which is repellent relative to the charge of the particles separated from the gas. It is to be understood that the tubes 54 are preferably perforated, however, they can be braided or formed into other gas pervious tubular configurations.

It can therefore be seen that the preferred apparatus, in addition to producing a useful by-product from the waste components in an industrial gas, also purifies the gas and removes water vapor therein without the necessity for large volumes of water normally used in conventional scrubbing systems. This is because of the attraction of the water vapor that take place as the gas is delivered through the system. The particular configuration of the fan assembly 10 provides a thorough mixing of the gas components while the configuration of the filter means 16 and the combination of the elements in the individual filter tubes 54 provide an extremely efficient separation system.

It is apparent that although I have described but a single embodiment of the present invention, many changes and modifications can be made therein without departing from the spirit of the invention as expressed in the scope of the appended claims.

Having described my invention, I claim:

1. In a structure having a gas conducting passage with means for producing a flow of a gas through said passage, filter means for separating particles from a gas delivered through said passage, said filter means comprising a plurality of polypropylene tubes disposed in said gas conducting passage in the path of said gas, said tubes having perforations and collectively forming a gas pervious barrier in the path of said gas, said tubes including polyvinylchloride beads in said tubes of smaller diameter than the size of said tube perforations, said beads being contained in a gas pervious polyethylene sock and operable to assist the gas in moving particles through said tubes, and means assisted by the flow of said gas for delivering the attracted particles exteriorly of said gas conducting passage.

2. In combination with a structure having a gas conducting passage, means for producing a flow of gas containing particles and water vapor through said passage, means for separating said particles from the gas comprising at least one polypropylene tube having a gas pervious wall mounted in said passage in the path of gas flow inclined in the direction of movement of said gas through said passage, said tube being provided with a gas pervious sock which contains beads therein.

3. Apparatus for separating particles from a gas, comprising:
   (a) structure having a mixing chamber with an inlet for receiving the gas, and a gas-conducting passage connected to said mixing chamber for the discharge of gas received from said mixing chamber, said passage having an outlet, said outlet being connected to a gas collection means;
   (b) means for delivering a stream of a gas with said particles to the inlet of said mixing chamber;
   (c) fan means in said mixing chamber for producing a flow of the gas and the particles through said inlet and toward the gas conducting passage, said fan means being operable to agitate the particles and to discharge the particles toward said gas conducting passage;
   (d) means in said passage for agitating said particles further;
   (e) filter means disposed in said gas conducting passage between said mixing chamber and the outlet of said passage, said filter means including:
      (i) a series of rows of tubes each having a gas pervious wall so that the tubes collectively form a gas pervious barrier in the path of gas flow through said passage;
      (ii) said tubes being inclined in said passage relative to the direction of gas flow so that the gas produces an axial flow of the particles toward the downstream end of said tubes and being formed of a polymeric material especially adapted to attract predetermined types of particles suspended in the gas as it flows over the surfaces of said tube so that the particles are attracted to the surfaces of said tubes;
      (iii) said tubes being provided with a gas pervious sock in each tube and beads contained by said each sock; and
   (f) means for continuously removing said separated particles from said filter means, said removing means including a venturi operatively connected to said tubes and to said mixing chamber so as to aspirate the particles from said tubes.

4. The apparatus as defined in claim 3, wherein said fan means and said agitating means are formed of a material operable to charge the particles with an electrostatic charge, and said tubes have surfaces especially adapted to assume an attractive electrostatic charge relative to the electrostatic charge of the particles as developed by said fan means and said agitating means.

5. A gas-liquid scrubbing apparatus for separating particles from a gas comprising:
   a mixing chamber having an inlet and an outlet;
   a centrifugal fan means located in said mixing chamber and including a plurality of substantially planar, rotatably mounted blades, means for rotating said blades about an axis;
   said inlet to said mixing chamber being arranged for delivering gas and liquid to said fan in a direction along said axis;

means for delivering a stream of gas to said inlet;

means for introducing liquid into said gas stream previous to said stream entering said mixing chamber;

said mixing chamber including a wall means against which the heavier particles of the gas and liquid mixture are thrown by said fan causing them to be separated from the remainder of said gas and liquid mixture and fall to the bottom of said mixing chamber;

said outlet of said mixing chamber, located at the lower portion thereof;

a conduit means connected to said outlet of said mixing chamber for the discharge of said educted liquid and the remainder of said mixture of gas and liquid, said conduit means including an outlet for the scrubbed gas;

said conduit being divided into two passages with a partition means therebetween providing a lower eduction channel for the separated liquid and an upper passageway for substantially the remaining mixture of gas and liquid;

a filter means in said conduit on the downstream side of said partition means and upstream of said conduit outlet, said filter means including:

(i) a series of rows of tubes in said upper passageway arranged so as to be inclined downwardly in the direction of the mixture flow;

(ii) each tube having a plurality of spaced openings in its walls providing a gas pervious wall so that the tubes collectively form a gas pervious barrier in the path of the mixture flow through said passageway, such tubes creating a pressure increase at the upstream face of the filter means thereby causing condensation of liquid in the mixture at said face;

said tubes also creating a tortuous path for the flow of the residual mixture of gas and liquid through said spaced openings;

liquid discharge means below said filter means for receiving liquid condensed at the face of said filter means and receiving liquid separated from said gas within said tubes, said discharge means communicating with said eduction channel.

6. The apparatus of claim 5 in which a means is provided to cause a portion of said remaining gas and liquid mixture to pass through said eduction channel; and means for causing said mixture passing through said channel to act as a venturi to aspirate particles separated from said mixture by said filter means into said eduction channel and liquid discharge means.

7. The apparatus of claim 6 in which the venturi is created by passing said mixed gas and liquid through said eduction channel beneath said tubes to reduce the pressure under said tubes within said channel.

8. The apparatus of claim 6 in which the portion of the passageway for the gas on the downstream side of the filter means between the filter means and the outlet of said passageway is arranged at a substantial angle to the portion of the passageway between the mixing chamber and the filter means.

References Cited

UNITED STATES PATENTS

| 877,460   | 1/1908  | Brunner et al.    | 55—464 X   |
|-----------|---------|-------------------|------------|
| 1,530,645 | 3/1925  | Brockway          | 55—431     |
| 1,542,556 | 6/1925  | Jordahl           | 55—444     |
| 1,875,711 | 9/1932  | Dudley            | 55—231     |
| 2,303,332 | 12/1942 | Dauphinee         | 55—515 X   |
| 2,557,279 | 6/1951  | Greenberg         | 55—515     |
| 2,992,700 | 7/1961  | Silverman et al.  | 55—103 X   |
| 3,307,332 | 3/1967  | Grace et al.      | 55—103     |
| 3,321,891 | 5/1967  | Coanda            | 55—103     |
| 3,461,882 | 8/1969  | Epstein et al.    | 131—262 B  |

FOREIGN PATENTS

| 1,051,122 | 9/1953 | France.        |
| 20,919    | 1909   | Great Britain. |

OTHER REFERENCES

Frederick, E. R.: "How Dust Filter Selection Depends on Electrostatics," Chemical Engineering, June 26, 1961, vol. 68, No. 13, pp. 107–114.

Van Orman et al.: "Self-Charging Electrostatic Air Filters," Heating, Piping and Air Conditioning, January 1952, pp. 157–163.

York Bulletin 35, "The Demister," Otto H. York Company Inc., 6 Central Ave., West Orange, N.J., 4 pages.

DENNIS E. TALBERT, JR., Primary Examiner

U.S. Cl. X.R.

23—2 R, 284, 315; 55—107, 108, 122, 126, 127, 131, 134, 138, 141, 146, 155, 156, 230, 233, 259, 262, 308, 316, 317, 318, 406, 428, 431, 437, 440, 442, 461, 462, 466, 473, 481, 485, 486, 515, 522, 529; 261—90, 116; 415—121